US010904202B2

(12) United States Patent
Bennett et al.

(10) Patent No.: US 10,904,202 B2
(45) Date of Patent: Jan. 26, 2021

(54) PACKET ROUTING USING A NETWORK DEVICE

(71) Applicant: Red Hat, Inc., Raleigh, NC (US)

(72) Inventors: Benjamin Bennett, Westford, MA (US); Aaron Patrick Conole, Westford, MA (US)

(73) Assignee: RED HAT, INC., Raleigh, NC (US)

( * ) Notice: Subject to any disclaimer, the term of this patent is extended or adjusted under 35 U.S.C. 154(b) by 0 days.

(21) Appl. No.: 15/892,745

(22) Filed: Feb. 9, 2018

(65) Prior Publication Data

US 2019/0253380 A1   Aug. 15, 2019

(51) Int. Cl.
*H04L 29/12* (2006.01)
*H04L 12/749* (2013.01)

(52) U.S. Cl.
CPC .......... *H04L 61/103* (2013.01); *H04L 45/741* (2013.01); *H04L 61/1552* (2013.01); *H04L 61/6009* (2013.01)

(58) Field of Classification Search
CPC ............... H04L 61/103; H04L 45/741; H04L 61/1552; H04L 61/6009
See application file for complete search history.

(56) References Cited

U.S. PATENT DOCUMENTS

| 7,822,027 | B2 | 10/2010 | Yadav et al. |
| 7,983,190 | B2 | 7/2011 | Hirota |
| 9,369,426 | B2 | 6/2016 | Kaponen et al. |
| 9,521,219 | B2* | 12/2016 | Walker ............... H04L 69/18 |
| 10,142,218 | B2* | 11/2018 | Cowart ............... H04L 45/22 |
| 2008/0031241 | A1* | 2/2008 | Toebes ............... H04L 41/12 370/389 |
| 2015/0081864 | A1* | 3/2015 | Dec ............... H04L 61/251 709/223 |

(Continued)

FOREIGN PATENT DOCUMENTS

CN   105718301 A   6/2016

OTHER PUBLICATIONS

*The Detailed Layer 3 Switch Process—Huawei*, http://support.huawei.com/onlinetoolsweb/special/switch-p003.html, 4 pages.

(Continued)

*Primary Examiner* — Ian N Moore
*Assistant Examiner* — Rushil Parimal Sampat
(74) *Attorney, Agent, or Firm* — Haynes and Boone, LLP

(57) ABSTRACT

An example method of routing a packet includes receiving, at a networking device, a first packet storing a first destination address of a first type and a second destination address of a second type. The example method also includes determining whether a mapping between the first and second destination addresses is valid. The example method further includes in response to a determination that the mapping is not valid: obtaining, at the networking device, a second packet storing the first destination address of the first type and a third destination address of the second type, the first destination address operating at a different network layer than the second and third destination addresses; and transmitting, at the networking device, the second packet to a receiver node, the first and third destination addresses being assigned to the receiver node.

20 Claims, 7 Drawing Sheets

(56) References Cited

U.S. PATENT DOCUMENTS

2017/0170990 A1    6/2017    Gaddehosur et al.

OTHER PUBLICATIONS

Valter Popeskic, *NDP-Neighbor Discovery Protocol*, 2012, https://howdoesinternetwork.com/2012/ndp-ipv6-neighbor-discovery-protocol, 11 pages.

Sean Wilkins, *Five Crucial Commands for Verifying Cisco Switch Network Status and Operational State*, http://www.pearsonitcertification.com/articles/article.aspx?p=2420613, 4 pages.

* cited by examiner

400

Receive, at a networking device, a first packet storing a first destination address of a first type and a second destination address of a second type ~402

Determine whether a mapping between the first and second destination addresses is valid ~404

In response to a determination that the mapping is not valid, obtain, at the networking device, a second packet and transmit, at the networking device, the second packet to a receiver node, where the second packet stores the first destination address of the first type and a third destination address of the second type, the first destination address operates at a different network layer than the second and third destination addresses, and the first and third destination addresses are assigned to the receiver node ~406

*FIG. 4*

PACKET ROUTING USING A NETWORK DEVICE

FIELD OF DISCLOSURE

The present disclosure generally relates to a computing system, and more particularly to a networked computing system.

BACKGROUND

A sender node or receiver node may be created and given an IP address and a MAC address. If the sender node desires to send a message to the receiver node, the sender node stores an IP address and MAC address assigned to the receiver node into a packet and transmits the packet over a network. A mapping between an IP address and a MAC address indicates that that the IP address and the MAC address were previously or are currently assigned to the same node The sender node may maintain an Address Resolution Protocol (ARP) table storing one or more mappings between an IP address and a MAC address. Address Resolution Protocol (ARP) may be used to resolve an IP address to the appropriate MAC address.

BRIEF SUMMARY

This disclosure relates to networked computing systems. Methods, systems, and techniques for routing a packet are disclosed.

An example method of routing a packet includes receiving, at a networking device, a first packet storing a first destination address of a first type and a second destination address of a second type. The example method also includes determining whether a mapping between the first and second destination addresses is valid. The example method further includes in response to a determination that the mapping is not valid, (i) obtaining, at the networking device, a second packet storing the first destination address of the first type and a third destination address of the second type, the first destination address operating at a different network layer than the second and third destination addresses, and (ii) transmitting, at the networking device, the second packet to a receiver node, the first and third destination addresses being assigned to the receiver node.

An example system for routing a packet includes a sender node that sends a first packet storing a first destination address of a first type and a second destination address of a second type. The example system also includes a networking device that receives the first packet and determines whether a mapping between the first and second destination addresses is valid. In response to a determination that the mapping is not valid, the networking device obtains a second packet storing the first destination address of the first type and a third destination address of the second type and transmits the second packet to a receiver node. The first and third destination addresses are assigned to the receiver node, and the second and third destination addresses operate at the same network layer.

An example machine-readable medium includes a plurality of machine-readable instructions that when executed by one or more processors is adapted to cause the one or more processors to perform a method including: receiving, at a networking device, a first packet storing a first destination address of a first type and a second destination address of a second type; determining whether a mapping between the first and second destination addresses is valid; and in response to a determination that the mapping is not valid: obtaining, at the networking device, a second packet storing the first destination address of the first type and a third destination address of the second type, the first destination address operating at a different network layer than the second and third destination addresses; and transmitting, at the networking device, the second packet to a receiver node, the first and third destination addresses being assigned to the receiver node.

BRIEF DESCRIPTION OF THE DRAWINGS

The accompanying drawings, which form a part of the specification, illustrate examples and together with the description, further serve to explain the principles of the disclosure. In the drawings, like reference numbers may indicate identical or functionally similar elements. The drawing in which an element first appears is generally indicated by the left-most digit in the corresponding reference number.

FIG. 4 is an example flowchart illustrating a method of routing a packet.

DETAILED DESCRIPTION

Figure 1A:
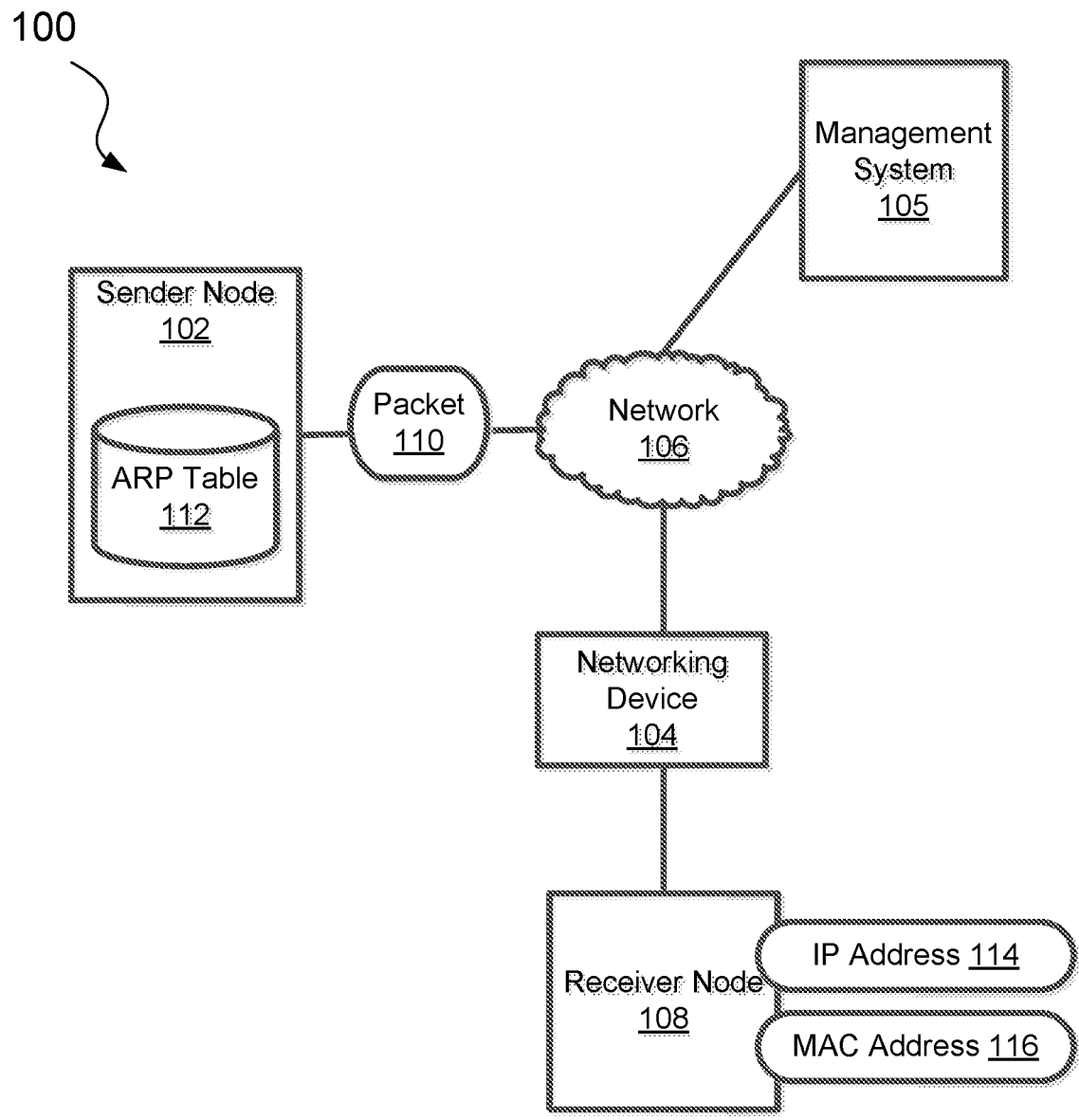
FIGS. 1A and 1B are diagrams illustrating an example system for routing a packet.

I. Overview
II. Example System Architecture
III. Example Process Flow
   A. Replace the Old MAC Address Stored in the Packet with the Updated MAC Address
   B. Sender Node Updates ARP Table to Reflect Valid IP-to-MAC Address Mapping
IV. Example System
V. Example Methods
VI. Example Computing System I. Overview It is to be understood that the following disclosure provides many different examples for implementing different features of the present disclosure. Some examples may be practiced without some or all of these specific details. Specific examples of components, modules, and arrangements may be described below to simplify the present disclosure. These are, of course, merely examples and are not intended to be limiting.

A node may be created and given an IP address and a MAC address. IP addresses may be assigned from a small pool (e.g., 256 IP addresses). If nodes are being created and destroyed quickly, the number of available IP addresses at any given moment may be small and the same IP addresses may be assigned and burned through quickly. Additionally, MAC address are assigned to a node randomly, independent from the IP address assigned to the node. If a first IP address and a first MAC address are assigned to a first node that lives for a short period of time, and a second node is created shortly thereafter, the first IP address recently assigned to the first node may be assigned to the second node. A second MAC address that is different from the first MAC address may be assigned to the second node.

If a sender node desires to send a packet to the second node, the sender node may store an old mapping between the first IP address and the first MAC address in a cache. In this example, no node currently exists that is given both the first IP address and the first MAC address. Because of the speed with which nodes are created and destroyed, the sender node may determine that the mapping between the first IP address and the first MAC address is still valid because the mapping has not yet timed out.

A problem results when the sender node stores the first IP address as the destination IP address and the outdated first MAC address as the destination MAC address. Although the IP address is valid, the first MAC address that the traffic is destined for is incorrect. Accordingly, the intended recipient assigned to the first IP address may receive the packet storing the incorrect mapping, but drop the packet because the destination MAC address stored in the packet is not assigned to the recipient.

A solution to solving the problem of packets including an incorrect MAC address may include identifying an inconsistent IP-to-MAC address mapping in the packet. In an example, a switching device may identify this inconsistency and modify the packet by replacing the incorrect destination MAC address stored in the packet with the correct destination MAC address. In another example, the network device may send an update message to the sender node, where the update message provides an indication to the sender to update the invalid mapping.

An example method of routing a packet includes receiving, at a networking device, a first packet storing a first destination address of a first type and a second destination address of a second type. The example method also includes determining whether a mapping between the first and second destination addresses is valid. The example method further includes in response to a determination that the mapping is not valid, (i) obtaining, at the networking device, a second packet storing the first destination address of the first type and a third destination address of the second type, the first destination address operating at a different network layer than the second and third destination addresses, and (ii) transmitting, at the networking device, the second packet to a receiver node, the first and third destination addresses being assigned to the receiver node.

The present disclosure may be advantageous to use in systems that create and destroy interfaces quickly under a management system. Although the present disclosure may refer to an interface as being an IP address, this is not intended to be limiting, and other interfaces that are assigned when created and unassigned when destroyed may be used. For example, the present disclosure may be used for host networking.

Unless specifically stated otherwise, as apparent from the following discussion, it is appreciated that throughout the description, discussions utilizing terms such as "determining," "storing," "analyzing," "receiving," "sending," "obtaining," "executing," transmitting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

II. Example System Architecture

Figure 1B:
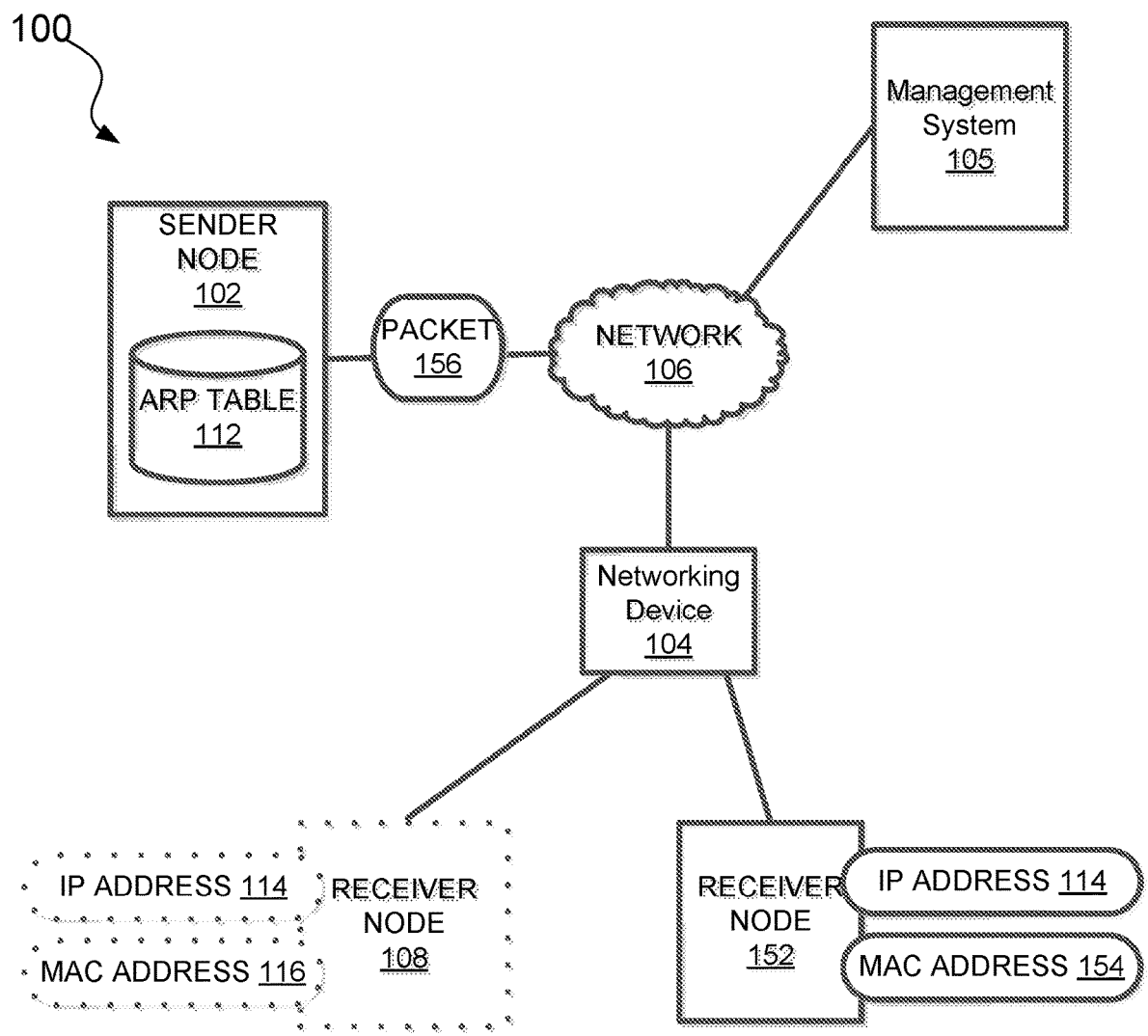

FIGS. 1A and 1B are diagrams illustrating an example system 100 for routing a packet. In some examples, system 100 may be used for updating networking layer two connectivity when switching at a networking layer three or above. System 100 includes a sender node 102, a networking device 104, and a management system 105 coupled to a network 106. Network 106 may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing.

Sender node 102 transmits one or more packets 110 over network 106 to one or more receiver node(s) 108. Sender node 102 may be a physical machine or a virtual machine or container running on the physical machine. Receiver node 108 may be a physical machine or a virtual machine or container running on the physical machine. Networking device 104 may be implemented in software or firmware that is executed on a computing device to forward packets to a receiver node. In an example, networking device 104 is a virtual programmable switch (e.g., Open vSwitch®). Trademarks are the property of their respective owners. Networking device 104 is located between network 106 and one or more receiver nodes 108. Although networking device 104 is illustrated as being separate from receiver node 108, this is not intended to be limiting. In another example, networking device 104 is located inside of a host machine that runs receiver node 108.

In system 100, the flow of the network and the knowledge of one or more host machines within the network are known to management system 105 and networking device 104. Management system 105 knows the desired state of one or more receiver nodes and sets the system to match the desired state. Management system 105 may be incorporated into a host system on the network or may be a machine separate from the host system. If a user desires to instantiate a virtual machine or create a container on the host system, the user may send instructions that cause management system 105 to satisfy the request.

Management system 105 manages the receiver nodes and has knowledge of the correct IP address and MAC address mappings associated with the host machine. One or more management systems may communicate the correct IP address and MAC address mappings associated with a respective host machine to a centralized management system or to a centralized host that stores the correct IP address and MAC address mappings for the network. In an example, management system 105 provides the correct IP address and MAC address mappings to networking device 104 as receiver nodes are created and destroyed on the network. In an example, networking device 10 is a switch. Networking device 104 may store these mappings into a table and determine whether an IP-to-MAC address mapping is valid. In an example, networking device 104 determines whether the mapping is valid by searching the table for the mapping. Networking device 104 may determine that the mapping is valid in response to a determination that the mapping is stored in the table and may determine that the mapping is not valid in response to a determination that the mapping is not stored in the table.

A packet is a formatted unit of data and stores control information and a payload. The control information provides data for delivering the payload to its intended destination. For example, the control information may include a source address, a destination address, error detection codes, and sequencing information. In an example, packet 110 stores a first destination address of a first type and a second destination address of a second type. Addresses of the first type are at a different networking layer than addresses of the second type. In an example, addresses of the first type are layer 3 addresses (e.g., Internet Protocol (IP) addresses), and addresses of the second type are layer 2 addresses (e.g., Media Access Control (MAC) addresses). Address Resolution Protocol (ARP) may be used to resolve an IP address to the appropriate MAC address. A mapping between a first address of the first type and a second address of the second type indicates that the first and second addresses are currently assigned or were previously assigned to the same node. Sender node 102 may maintain an ARP table 112 storing one or more mappings between an address of the first type (e.g., IP address) and an address of the second type (e.g., MAC address). In an example, ARP table 112 is stored in a cache.

Sender node 102 and one or more receivers 108 may be connected to each other in a local area network (LAN) by Ethernet cables and networking device 104, with no intervening gateways or routers. An IP address and a MAC address are assigned to a node. Sender node 102 may desire to transmit a message to receiver node 108. Through Domain Name System (DNS), sender node 102 determines that receiver node 108 has an IP address 114. To send the message, sender node 102 determines receiver node 108's MAC address. Sender node 102 uses a cached ARP table 112 to look up receiver node 108's IP address for any existing records of receiver node 108's MAC address. If ARP table 112 stores a mapping between IP address 114 and a MAC address, sender node 102 may identify this MAC address as being the one assigned to receiver node 108. If receiver node 108's MAC address is found in ARP table 112, sender node 102 transmits packet 110 storing IP address 114 and MAC address 116, which sender node 102 assumes are both currently assigned to receiver node 108.

If ARP table 112 does not store a mapping between receiver node 108's IP address and MAC address, sender node 102 sends a broadcast ARP message, which is accepted by computers on network 106, requesting an answer for IP address 114. Receiver node 108 recognizes the IP address 114 as the one assigned to it and accordingly responds with its assigned IP address 114 and MAC address 116. In an example, receiver node 108 maintains its own ARP table (not shown) and inserts an entry including the IP and MAC addresses assigned to sender node 102 into this ARP table for future use. Sender node 102 caches the response information from receiver node 108 into ARP table 112 and sends packet 110 storing IP address 114 and MAC address 116 over the network. For example, sender node 102 caches the response information by storing a mapping between IP address 114 and MAC address 116 into ARP table 112.

As illustrated in FIG. 1B, at a later point in time, receiver node 108 may cease to exist (as indicated by the dashed lines), and thus IP address 114 becomes available for assignment to another receiver node. Each time a receiver node is created, an IP address and a MAC address are assigned to the created node. The MAC address may be randomly assigned to the receiver node, regardless of the assigned IP address. In an example, the IP address is assigned from a small pool of IP address (e.g., 256 IP addresses). If nodes are continuously being created and destroyed, the number of available IP addresses at any given moment may be small and the same IP addresses may be assigned and burned through quickly.

In FIG. 1B, receiver node 152 is created and can be given IP address 114, which was recently assigned to receiver node 108. Additionally, receiver node 152 may be given a completely different MAC address than the one assigned to receiver node 108. In this example, if sender node 102 desires to send a packet 156 to receiver node 152, IP address 114 may still be stored in ARP table 112. Sender node 102 and a number of other nodes on the network may determine that the entry storing the mapping between IP address 114 and MAC address 116, which were previously assigned to receiver node 108, has not timed out (e.g., has not reached its time-to-live (TTL)) and accordingly, does not refresh its IP-to-MAC address mapping to reflect the correct mapping between IP address 114 and MAC address 154. Sender node 102 may incorrectly determine that IP-to-MAC address mappings stored in ARP table 112 that have not timed out are still valid mappings. If sender node 102 stores the correct IP address (e.g., IP address 114) and the wrong MAC address (e.g., MAC address 116) into packet 156, which sender node 102 intends to be sent to receiver node 152, the packet will be dropped. For example, if receiver node 152 receives packet 156, receiver node 152 may drop it because although the destination IP address stored in the packet is assigned to receiver node 152, the MAC address stored in the packet is not.

II. Example Process Flow

Figure 2:
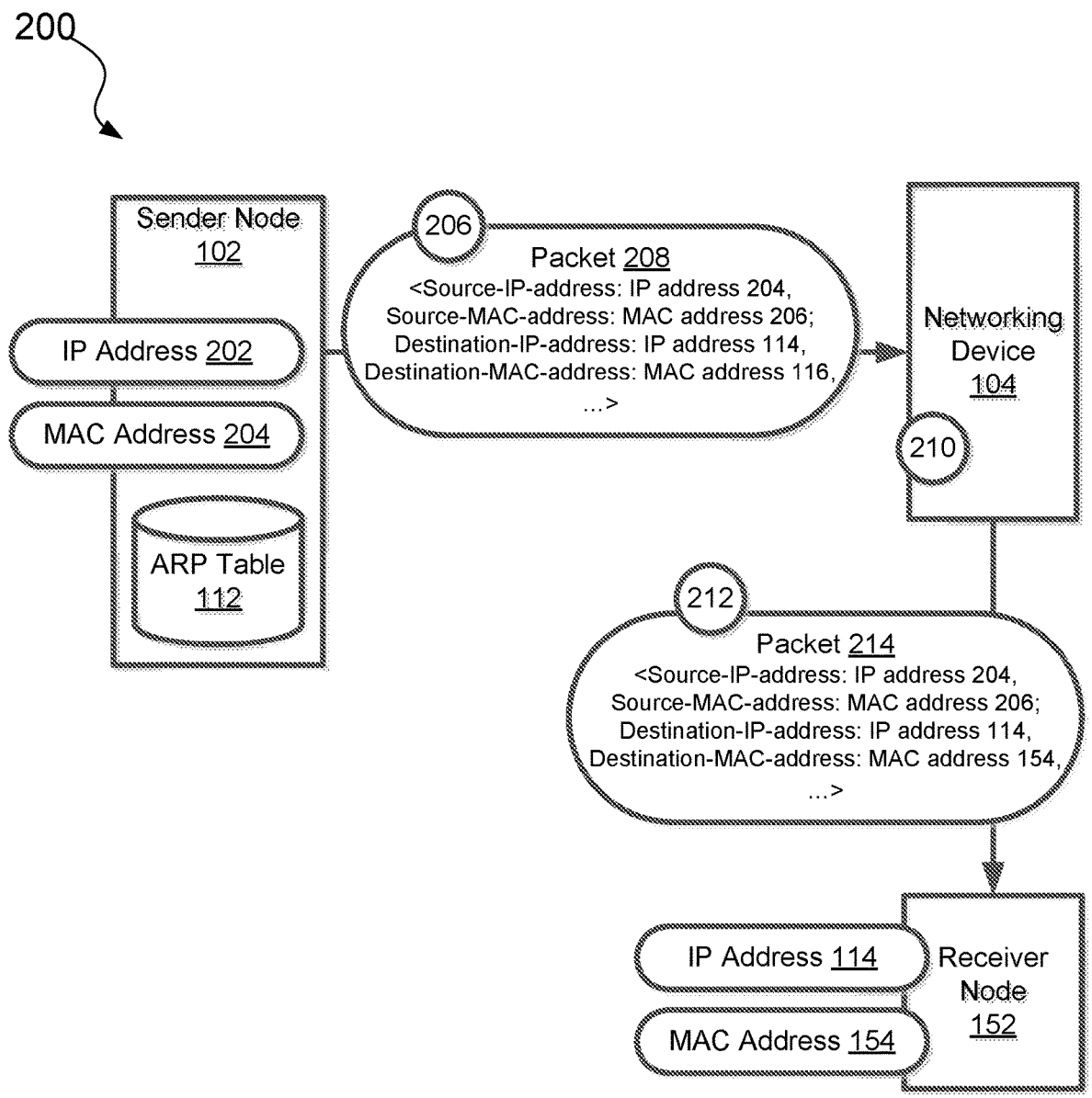
FIG. 2 is a diagram illustrating an example process flow for routing a packet to a sender node's intended destination.

The present disclosure provides teachings that route one or more packets correctly to the sender node's intended destination(s), regardless of whether the sender node included in the correct destination MAC address in the packet. FIG. 2 is a diagram illustrating an example process flow 200 for routing a packet to a sender node's intended destination. In FIG. 2, IP address 202 and MAC address 204 are assigned to sender node 102, which caches ARP table 112. At action 206, networking device 104 receives a packet 208 storing a first source address of a first type (source IP address 204), a second destination address of a second type (source MAC address 206), a first destination address of the first type (destination IP address 114), and a second destination address of the second type (destination MAC address 116).

At action 210, networking device 104 determines whether a mapping between IP address 114 and MAC address 116 is valid. In an example, networking device 104 may maintain a table storing one or more mappings between an IP address and a MAC address. If a mapping is stored in the table, networking device 104 determines that the mapping is valid. If the mapping is not stored in the table, networking device 104 determines that the mapping is not valid.

In response to a determination that the mapping is not valid, at action 212, networking device 104 obtains a packet 214 and transmits packet 214 to receiver node 152, the rightful recipient of the packet. Networking device 104 has knowledge of which physical port to use to transmit a packet to its intended receiver node. Packet 214 stores source IP address 204, source MAC address 206, destination IP address 114, and destination MAC address 154. Packet 214 stores the correct and valid mapping between IP address 114 and MAC address 154, which are assigned to currently running receiver node 152. Destination IP address 114 operates at a different network layer than destination MAC addresses 116 and 154. Additionally, MAC addresses 116 and 154 operate at the same network layer.

In response to a determination that the mapping between IP address 114 and MAC address 116 is valid, networking device 104 transmits packet 208 to receiver node 108, which is different from receiver node 152. IP address 114 and MAC address 116 are assigned to receiver node 108.

A. Replace the Old MAC Address Stored in the Packet with the Updated MAC Address Referring to FIG. 2, networking device 104 may receive packet 208 use a variety of techniques to route the packet to the sender node's intended recipient. In an example, networking device 104 identifies an inconsistency in the mapping between IP address 114 and MAC address 116. Networking device 104 knows that any traffic to IP address 114 should have a destination MAC address 154 because it knows the state of the currently running receiving node(s) 154 running on a host machine and their correct IP-to-MAC address mappings. Networking device 104 reviews the multiple layers of addresses (e.g., IP and MAC addresses) stored in the packet to determine whether the packet stores the correct destination MAC address. Based on the destination IP address stored in the packet, the networking device 104 corrects the MAC address stored in the packet and knows through which physical port to transmit the packet.

In an example, networking device 104 maintains a table storing one or mappings between IP addresses and MAC addresses. Networking device 104 determines whether the mapping between IP address 114 and MAC address 116 is valid by searching the table for the mapping. Networking device 104 determines that the mapping is valid in response to a determination that the mapping is stored in the table and determines that the mapping is not valid in response to a determination that the mapping is not stored in the table. If networking device 104 determines that the mapping is not valid, networking device 104 subverts the layer 2 data stored in packet 208.

In an example, networking device 104 obtains packet 214 by updating, based on a second mapping that includes IP address 114 stored in the table, packet 208, where the second mapping is between IP address 114 and MAC address 154. Networking device 104 may update packet 208 by replacing MAC address 116 stored in packet 208 with MAC address 154. Networking device 104 may then transmit packet 214 directly to receiver node 152 via a physical port associated with receiver node 152. In this example, sender node 102 is not aware that it stored the wrong MAC address 116 into packet 208, which sender node 102 intended for receiver node 152.

In another example, networking device 104 searches the table storing one or mappings between IP addresses and MAC addresses for a second mapping including IP address 114 and identifies MAC address 154 in the second mapping. After networking device 104 identifies MAC address 154 in the second mapping, networking device 104 replaces MAC address 116 stored in packet 208 with MAC address 154 to obtain packet 214.

B. Sender Node Updates ARP Table to Reflect Valid IP-to-MAC Address Mapping

Rather than directly modify the destination MAC address stored in packet 208, networking device 104 may send an update message to sender node 102 to cause the sender node to update ARP table 112 to reflect the correct IP-to-MAC address mapping. In an example, sender node 102 caches ARP table 112, which stores a first mapping between IP address 114 and MAC address 116. Sender node 102 may transmit packet 208 storing a source IP address 204 and a source MAC address 206, which are assigned to sender node 102. In response to a determination that the first mapping is not valid, networking device 104 sends the update message that causes the sender node to replace the first mapping in ARP table 112 with a second mapping. The second mapping is between IP address 114 and MAC address 154.

Sender node 102 receives the update message from networking device 104, updates ARP table 112 to reflect the correct mapping, and sends packet 214 to networking device 104. Networking device 104 obtains packet 214 from sender node 102 and transmits the packet to receiver node 152. In an example, the update message complies with ARP, which is used to resolve based on IP address 114, the correct MAC address. In this example, the update message may be an ARP packet. Sender node 102 may receive and process the ARP packet, which may cause the invalid mapping stored in ARP table 112 to time out. Sender node 102 may send a broadcast ARP message and receive an ARP response, which includes the correct IP-to-MAC address mapping. Sender node 102 updates ARP table 112 to reflect the correct IP-to-MAC address mapping. In this example, networking device 104 receives a packet destined at layer 3, turns the packet into a layer 2 packet, and transmits the layer 2 packet to sender node 102 so that the sender node may have the correct IP-to-MAC address mapping stored in ARP table 112. When sender node 102 transmits a packet to receiver node 152 in the future, the sender node will store the correct MAC address 154 into the packet.

IV. Example System

Figure 3:
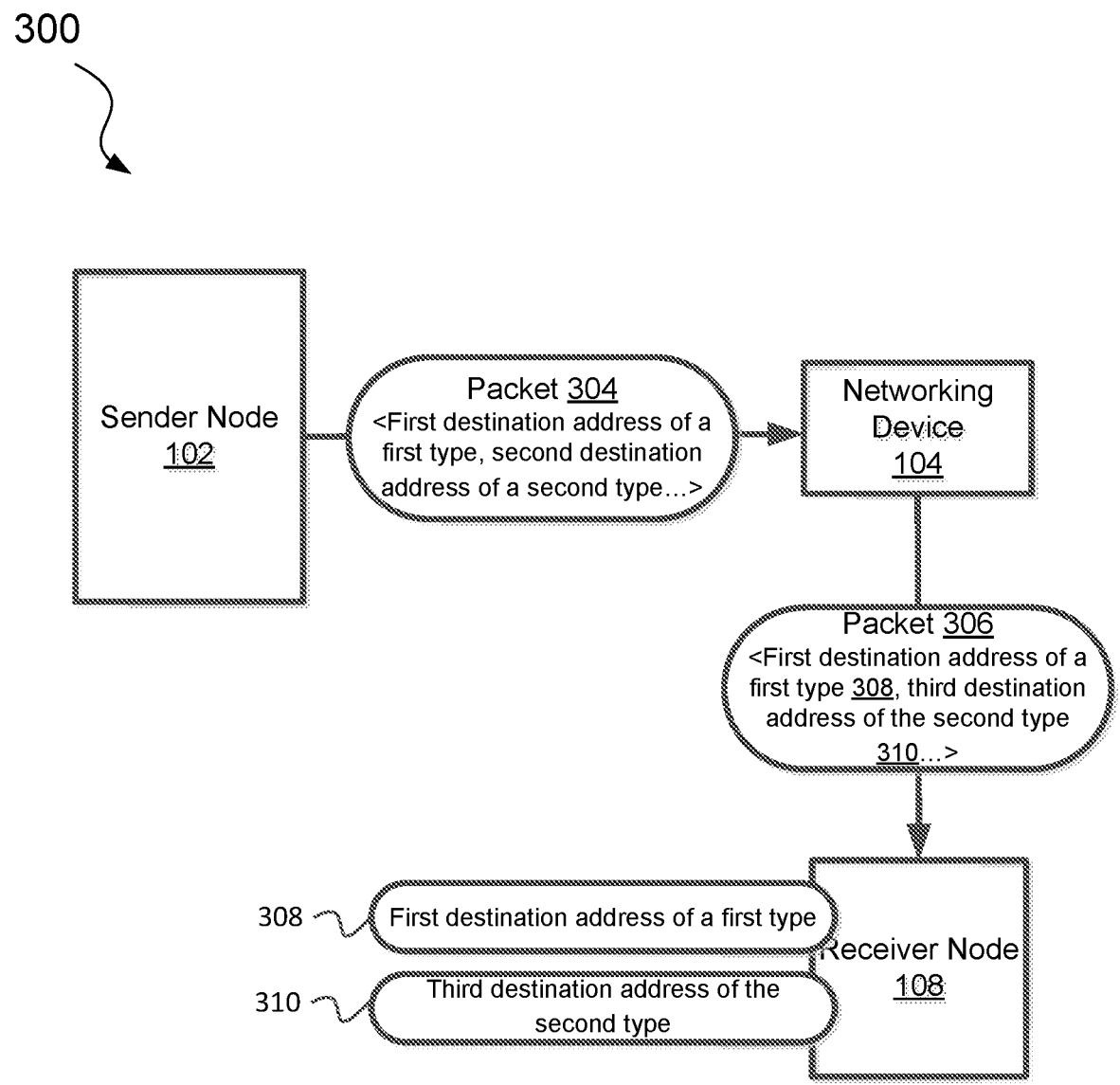
FIG. 3 is a diagram illustrating an example system for routing a packet.

FIG. 3 is a diagram illustrating an example system 300 for routing a packet. In FIG. 3, sender node 102 that sends packet 304 storing a first destination address of a first type and a second destination address of a second type.

Networking device 104 receives packet 304 and determines whether a mapping between the first and second destination addresses is valid. In response to a determination that the mapping is not valid, networking device 104 obtains a packet 306 storing the first destination address of the first type and a third destination address of the second type and transmits packet 306 to receiver node 108. In an example, the first destination address of the first type is IP address 114, and the third destination address of the second type is MAC address 154. The first and third destination addresses are assigned to receiver node 152. The second and third destination addresses operate at the same network layer and operator at a different network layer than the first destination address.

V. Example Methods

FIG. 4 is an example flowchart illustrating a method 400 of routing a packet. Method 400 is not meant to be limiting and may be used in other applications. Method 400 may be performed by processing logic that may include hardware (e.g., circuitry, dedicated logic, programmable logic and microcode), software (such as instructions run on a computer system, specialized hardware, dedicated machine, or processing device), firmware, or a combination thereof. In some examples, blocks of method 400 may be performed on system 100 illustrated in FIG. 1 and/or system 300 illustrated in FIG. 3. The order of the blocks below may also be performed according to alternative orderings. In yet other examples, additional blocks may be added and blocks that are described may be removed.

Method 400 includes blocks 402, 404, and/or 406. In block 402, networking device 104 receives a first packet storing a first destination address of a first type and a second destination address of a second type. In block 404, it is determined whether a mapping between the first and second destination addresses is valid. In block 406, in response to a determination that the mapping is not valid, the networking device obtains a second packet and transmits the second packet to a receiver node, where the second packet stores the first destination address of the first type and a third destination address of the second type, the first destination address operates at a different network layer than the second and third destination addresses, and the first and third destination addresses are assigned to the receiver node.

It is also understood that additional blocks may be executed before, during, or after blocks 402-406 discussed above. It is also understood that one or more of the blocks of method 400 described herein may be omitted, combined, or performed in a different sequence as desired.

Figure 5:
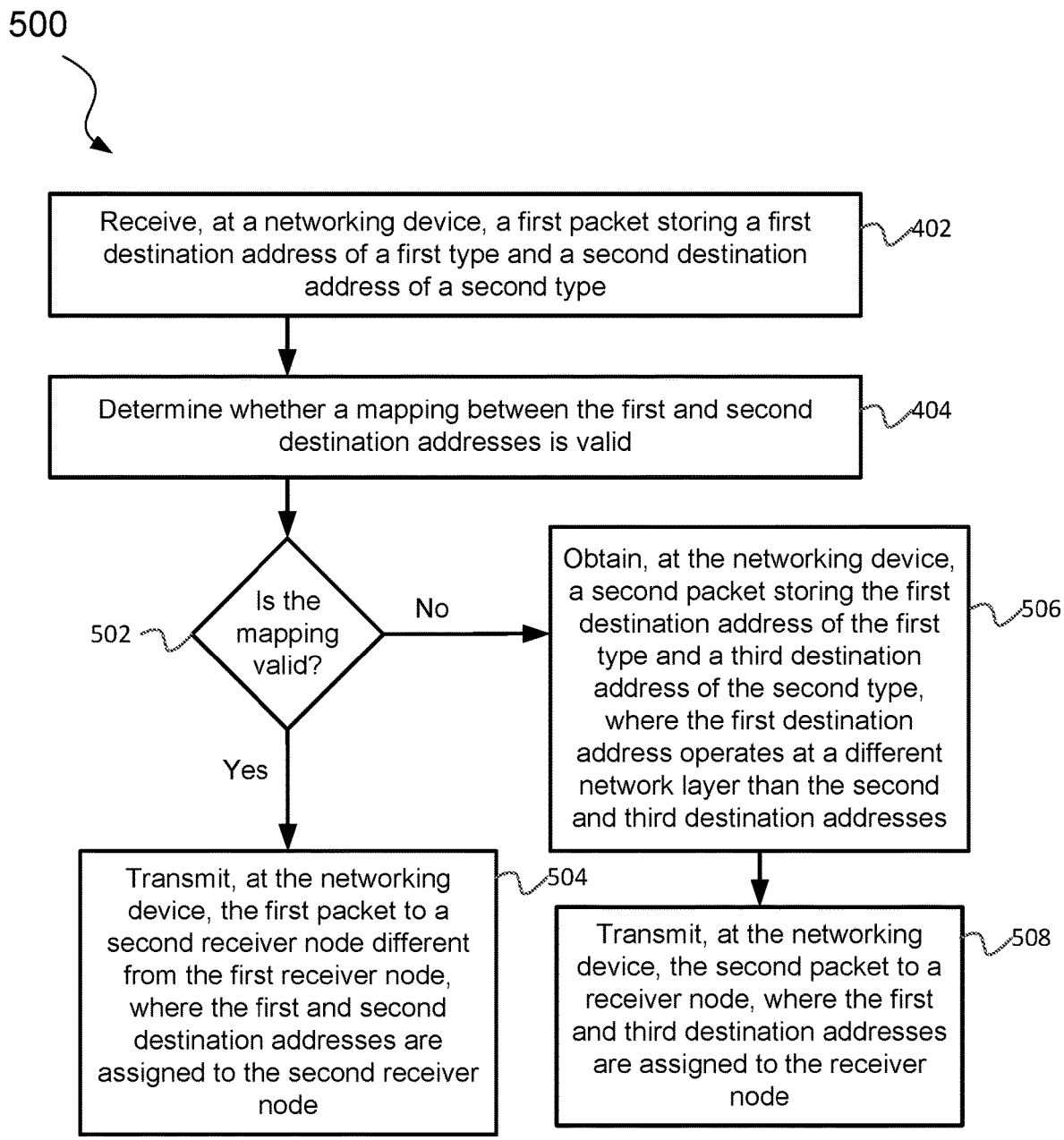
FIG. 5 is an example flowchart illustrating another method of routing a packet.

FIG. 5 is an example flowchart illustrating a method 500 of routing a packet. Method 500 is not meant to be limiting and may be used in other applications. Method 500 may be performed by processing logic that may include hardware (e.g., circuitry, dedicated logic, programmable logic and microcode), software (such as instructions run on a computer system, specialized hardware, dedicated machine, or processing device), firmware, or a combination thereof. In some examples, blocks of method 500 may be performed on system 100 illustrated in FIG. 1 or system 300 illustrated in FIG. 3. The order of the actions described below may also be performed according to alternative orderings. In yet other examples, additional actions may be added and actions that are described may be removed.

Method 500 includes blocks 402, 404, 502, 504, 506, and/or 508. After block 404 of method 500, process flow proceeds to decision block 502, where it is determined whether the mapping is valid. If the mapping is valid, proceeds flow proceeds from decision block 502 to block 504, at which the networking device transmits the first packet to a second receiver node different from the first receiver node, where the first and second destination addresses are assigned to the second receiver node. If the mapping is not valid, proceeds flow proceeds from decision block 502 to block 506, at which the networking device obtains a second packet storing the first destination address of the first type and a third destination address of the second type, where the first destination address operates at a different network layer than the second and third destination addresses. In block 508, the networking device transmits the second packet to a receiver node, where the first and third destination addresses are assigned to the receiver node.

It is also understood that additional blocks may be executed before, during, or after blocks 402, 404, and 502-508 discussed above. It is also understood that one or more of the blocks of method 500 described herein may be omitted, combined, or performed in a different sequence as desired.

As discussed above and further emphasized here, FIGS. 1-5 are merely examples, which should not unduly limit the scope of the claims.

V. Example Computer System

In an example, each of a sender node, management system, receiver node, and networking device may be implemented in a tailored electrical circuit or as software instructions to be used in conjunction with a processor to create a hardware-software combination that implements the specific functionality described herein. To the extent that an example includes computer-executable instructions, those instructions may include software that is stored on a computer-readable medium. Each of sender node, management system, receiver node, and networking device may execute on a computing device including one or more processors and a memory, and may execute on different computing devices.

Figure 6:
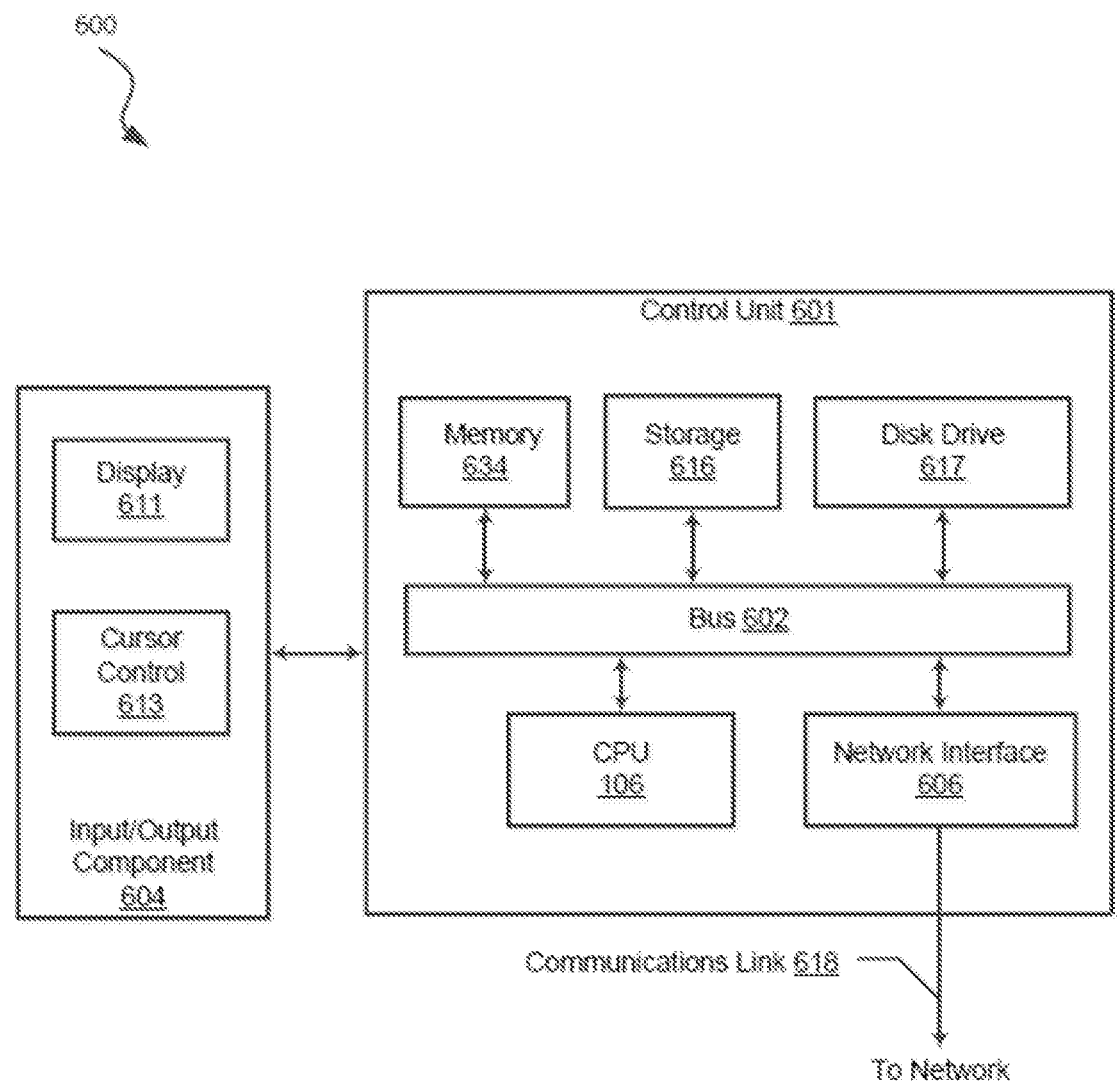
FIG. 6 is a block diagram of an electronic system suitable for implementing one or more embodiments of the present disclosure.

FIG. 6 is a block diagram of a computer system 600 suitable for implementing one or more examples of the present disclosure. In various implementations, computer system 600 corresponds to sender node, management system, receiver node, or networking device. Computer system 600 may include one or more storage devices each selected from a group including floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a central processing unit (CPU) or computer is adapted to read. The one or more storage devices may include stored information that may be made available to one or more computing devices and/or computer programs (e.g., clients) coupled to a computing device using a computer network (not shown). The computer network may be any type of network including a LAN, a WAN, an intranet, the Internet, a cloud, and/or any combination of networks thereof that is capable of interconnecting computing devices and/or computer programs in the system.

Computer system 600 includes a bus 602 or other communication mechanism for communicating information data, signals, and information between various components of computer system 600. Components include an I/O component 604 that processes a user action, such as selecting keys from a keypad/keyboard or selecting one or more buttons or links, and sends a corresponding signal to bus 602. In an example, a user may interact with a host computing system using I/O component 604 and cause a receiver node (e.g., a physical machine, virtual machine, or container) to launch. I/O component 604 may also include an output component such as a display 611, and an input control such as a cursor control 613 (such as a keyboard, keypad, or mouse).

A transceiver or network interface 606 transmits and receives signals between computer system 600 and other devices via a communications link 618 to a network. In an example, the transmission is wireless, although other transmission mediums and methods may also be suitable. A CPU, which may be a micro-controller, digital signal processor (DSP), or other processing component, processes these various signals, such as for display on computer system 600 or transmission to other devices via communications link 618. The CPU may also control transmission of information, such as cookies or IP addresses, to other devices.

Components of computer system 600 also include a system memory component 634 (e.g., RAM), a static storage component 616 (e.g., ROM), and/or a disk drive 617. Computer system 600 performs specific operations by the CPU and other components by executing one or more sequences of instructions contained in system memory component 634. Logic may be encoded in a computer readable medium, which may refer to any medium that participates in providing instructions to the CPU for execution. Such a medium may take many forms, including but not limited to, non-volatile media, volatile media, and transmission media.

In various implementations, non-volatile media includes optical, or magnetic disks, or solid-state drives, volatile media includes dynamic memory, such as system memory component 634, and transmission media includes coaxial cables, copper wire, and fiber optics, including wires that include bus 602. In an example, the logic is encoded in non-transitory computer readable medium. In an example, transmission media may take the form of acoustic or light waves, such as those generated during radio wave, optical, and infrared data communications. Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various examples, execution of instruction sequences (e.g., method 400 and/or method 500) to practice the present disclosure may be performed by computer system 600. In various other examples, a plurality of computer systems 600 coupled by communication links 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various examples provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various blocks, steps, or actions described herein may be changed, combined into composite blocks, steps, or composite actions, and/or separated into sub-blocks, sub-steps, or sub-actions to provide features described herein.

The foregoing disclosure is not intended to limit the present disclosure to the precise forms or particular fields of use disclosed. As such, it is contemplated that various alternate examples and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A method of routing a packet, the method comprising:
    receiving, at a networking device, a first packet storing a first destination address and a second destination address, wherein the first destination address is a layer 3 address and the second destination address is a layer 2 address;
    determining whether a first mapping from the first destination address to the second destination address is valid, wherein if the first mapping is not valid, assignment of the first destination address to a first receiver node has expired; and
    in response to a determination that the first mapping is not valid:
        obtaining, at the networking device, a second packet storing the first destination address and a third destination address that is a layer 2 address; and
        transmitting, at the networking device, the second packet to a second receiver node, the first and third destination addresses being assigned to the second receiver node;
    wherein determining whether the first mapping is valid includes searching a table for the first mapping, the method further comprising:
        determining that the first mapping is valid in response to a determination that the first mapping is stored in the table; and
        determining that the first mapping is not valid in response to a determination that the first mapping is not stored in the table;
        wherein obtaining the second packet includes updating, based on a second mapping that includes the first destination address and is stored in the table, the first packet and updating the first packet includes replacing the second destination address stored in the first packet with the third destination address, the second mapping being from the first destination address to the third destination address.

2. The method of claim 1, further comprising:
    in response to a determination that the first mapping is valid, transmitting, at the networking device, the first packet to the first receiver node different from the second receiver node, the first and second destination addresses being assigned to the second receiver node.

3. The method of claim 2, wherein the first receiver node completes running before the second receiver node runs, and the first destination address is assigned to the second receiver node after assignment of the first destination address to the first receiver node has expired.

4. The method of claim 1, wherein the first destination address is an Internet Protocol (IP) address.

5. The method of claim 4, wherein the second destination address is a first Media Access Control (MAC) address, and wherein the third destination address is a second MAC address.

6. The method of claim 1, further comprising:
    in response to the determination that the first mapping is not valid, sending, at the networking device, an update message that causes a sender node that sent the first packet to update a cache by replacing the first mapping with a second mapping, the second mapping being from the first destination address to the third destination address, and
    wherein obtaining the second packet includes obtaining the second packet from the sender node.

7. The method of claim 6, wherein the update message is an Address Resolution Protocol (ARP) packet.

8. A system for routing a packet, the system comprising:
    a sender node that sends a first packet storing a first destination address of a first type and a second destination address of a second type, wherein the first destination address of the first type is a layer 3 address and the second destination address is a layer 2 address; and
    a networking device that receives the first packet and determines whether a first mapping from the first destination address to the second destination address is valid, wherein if the first mapping is not valid, assignment of the first destination address to a first receiver node has expired, wherein in response to a determination that the first mapping is not valid, the networking device obtains a second packet storing the first destination address of the first type and a third destination address of the second type and transmits the second packet to a second receiver node, wherein the first and third destination addresses are assigned to the second receiver node, and the second destination address operates at the same network layer as the third destination address;

wherein the networking device maintains a table storing one or more mappings including an address of the first type and an address of the second type, and wherein the first mapping is valid if the first mapping is stored in the table;

wherein the networking device searches the table for a second mapping including the first destination address and identifies the third destination address in the second mapping to obtain the second packet and wherein after the networking device identifies the third destination address in the second mapping, the networking device replaces the second destination address stored in the first packet with the third destination address to obtain the second packet.

9. The system of claim 8, wherein the networking device transmits the second packet to the second receiver node via a physical port associated with the second receiver node.

10. The system of claim 8, wherein the first destination address of the first type is an Internet Protocol (IP) address, the second destination address of the second type is a first Media Access Control (MAC) address, and the third destination address of the second type is a second MAC address.

11. The system of claim 8, wherein the sender node maintains a cache storing the first mapping, wherein the first packet stores a first source address of the first type and a second source address of the second type, and the first and second source addresses are assigned to the sender node, wherein in response to the determination that the first mapping is not valid, the networking device sends an update message to the sender node that causes the sender node to replace the first mapping in the cache with a second mapping, wherein the second mapping includes the first and third destination addresses, and wherein the networking device obtains the second packet from the sender node.

12. The system of claim 11, wherein the update message complies with an Address Resolution Protocol (ARP) that is used to resolve, based on the first destination address, the third destination address.

13. A non-transitory machine-readable medium comprising a plurality of machine-readable instructions that when executed by one or more processors is adapted to cause the one or more processors to perform a method comprising:

receiving, at a networking device, a first packet storing a first destination address of a first type and a second destination address of a second type, is a layer 3 address and the second destination address is a layer 2 address;

determining whether a mapping from the first destination address to the second destination address is valid, wherein if the first mapping is not valid, assignment of the first destination address to a first receiver node has expired; and in response to a determination that the mapping is not valid:

obtaining, at the networking device, a second packet storing the first destination address of the first type and a third destination address of the second type, wherein the second destination address operates at the same network layer as the third destination address; and transmitting, at the networking device, the second packet to a second receiver node, the first and third destination addresses being assigned to the second receiver node;

wherein the first and third destination addresses are assigned to the second receiver node, and the second destination address operates at the same network layer as the third destination address;

wherein the networking device maintains a table storing one or more mappings including an address of the first type and an address of the second type, and wherein the first mapping is valid if the first mapping is stored in the table;

wherein the networking device searches the table for a second mapping including the first destination address and identifies the third destination address in the second mapping to obtain the second packet and wherein after the networking device identifies the third destination address in the second mapping, the networking device replaces the second destination address stored in the first packet with the third destination address to obtain the second packet.

14. The machine-readable medium of claim 13, wherein the first destination address of the first type is an Internet Protocol (IP) address, the second destination address of the second type is a first Media Access Control (MAC) address, and the third destination address of the second type is a second MAC address.

15. The method of claim 13, wherein the first receiver node completes running before the second receiver node runs.

16. The method of claim 15, wherein the first destination address is assigned to the second receiver node after assignment of the first destination address to the first receiver node has expired.

17. The method of claim 13, wherein the first destination address is an Internet Protocol (IP) address.

18. The method of claim 13, wherein the second destination address is a first Media Access Control (MAC) address, and wherein the third destination address is a second MAC address.

19. The method of claim 13, further comprising:

in response to the determination that the first mapping is not valid, sending, at the networking device, an update message that causes a sender node that sent the first packet to update a cache by replacing the first mapping with a second mapping, the second mapping being from the first destination address to the third destination address, and wherein obtaining the second packet includes obtaining the second packet from the sender node.

20. The method of claim 19, wherein the update message is an Address Resolution Protocol (ARP) packet.

* * * * *